United States Patent [19]
Luyten

[11] 4,449,555
[45] May 22, 1984

[54] DEVICE FOR TRANSFERRING ARTICLES

[75] Inventor: Jacobus H. Luyten, Va Steyl, Netherlands

[73] Assignee: Helmes Machinefabriek B.V., Netherlands

[21] Appl. No.: 365,479

[22] Filed: Apr. 5, 1982

[30] Foreign Application Priority Data

Apr. 6, 1981 [NL] Netherlands .................... 8101689

[51] Int. Cl.³ .............................................. B27F 1/00
[52] U.S. Cl. ............................ 144/198 R; 144/242 R; 198/485; 414/104
[58] Field of Search ............ 144/198 R, 242 R, 242.6; 414/104, 109, 107; 198/605, 607, 485, 488; 193/25 R, 25 A, 25 FT

[56] References Cited

U.S. PATENT DOCUMENTS 1,708,601  4/1929  Bird ................................. 144/198 R
3,976,208  8/1976  Buix et al. .............................. 414/32

FOREIGN PATENT DOCUMENTS 2019339 of 0000 United Kingdom.

Primary Examiner—W. D. Bray
Assistant Examiner—Jorji M. Griffin
Attorney, Agent, or Firm—Ostrolenk, Faber, Gerb & Soffen

[57] ABSTRACT

A guide device for the transfer of articles from a feed path or a tooling path to a lower discharge path of a machine tool. The guide device has a vertical component situated at the end of the tooling path of the machine tool and a horizontal component which passes into the discharge path. The vertical component changes the direction of the arriving article, and the horizontal component brings the article into a pre-oriented position on the discharge path, running toward the tending side of the tooling path.

10 Claims, 4 Drawing Figures

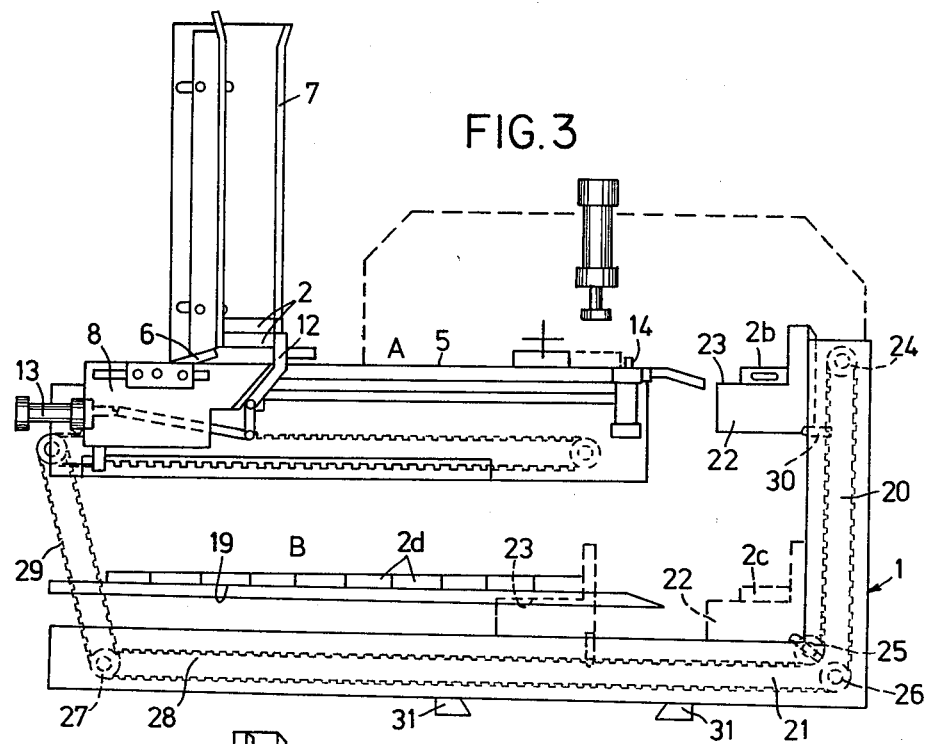
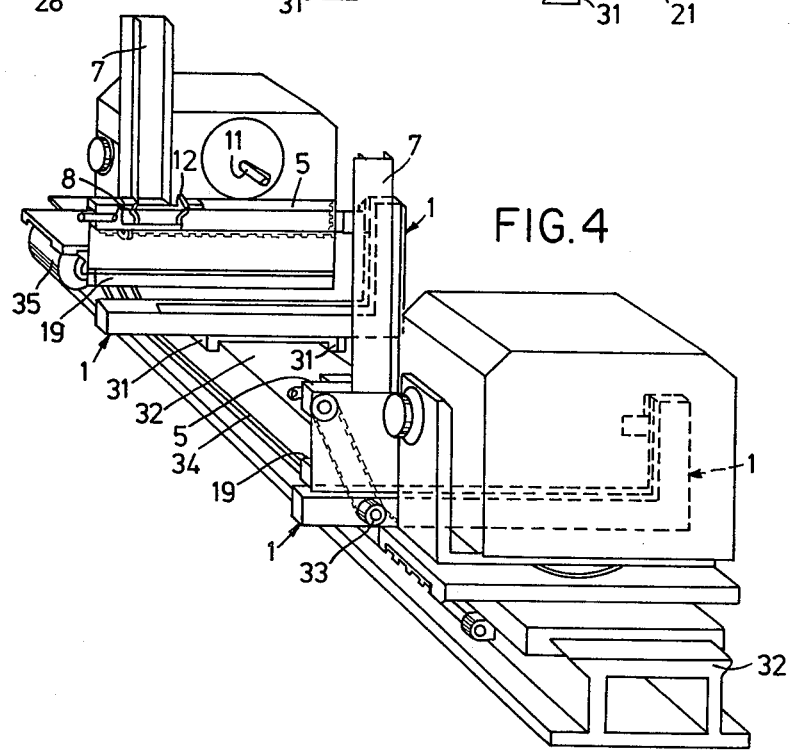

DEVICE FOR TRANSFERRING ARTICLES

BACKGROUND OF THE INVENTION

1. Field of the Invention

The present invention relates to a device for transferring articles from a feed path or a tooling path to a lower discharge path, a guide device passing between the said paths.

The invention is also embodied in a machine tool, more particularly a woodworking machine, such as a tenoner, fitted with the said guide device for transferring articles.

2. Description of the Prior Art

In practice it often happens that articles which have been subjected to tooling or another operation, must be delivered in a specific position and for this purpose various, generally very complex, devices have been used in the art.

For machine tools it is an advantage that articles which are fed in from the laying-on side of the machine should also be removed from that side, preferably in an oriented position, so that the articles can be handled further as a block in order to proceed easily to, for example, a subsequent operation or a subsequent machine.

It is evident that in a machine tool little space is available for the application of complicated positioning devices, while moreover such complicated positioning devices are too expensive to allow such machines to be supplied at a competitive price.

SUMMARY OF THE INVENTION

It is, therefore, a primary object of the present invention to provide a simple device for the transfer of articles, which lends itself particularly well to application in machines.

According to the invention this is possible with a device of the type as described at the beginning, wherein a vertical component of the guide device is situated at the end of the tooling path and a horizontal component of said guide device passes into the discharge path, the vertical component changing the direction of the arriving article while the horizontal component brings the article in a pre-oriented position on the discharge path, said discharge path running toward the tending side of the tooling path.

The advantage thereof is that the articles arrive onto the guide device in a simple manner and are immediately clear of the feed path, in contrast to known devices in which the articles must first be seized, for example with the aid of gripping jaws.

A further advantage of the invention is that the horizontal component brings the articles at the discharge path in a controlled manner, without disturbing their position.

A machine tool, more particularly a woodworking machine, such as a tenoner, fitted with a device for transferring articles according to the invention is in particular distinguished in that the feed path is the working bed of the machine with a workpiece holder and workpiece conveyor, with which the workpiece can be moved at least before and after the tooling operation and in that the discharge path in the form of supporting rails is set up below the working bed of the machine, the guide device being mounted behind and below the working bed of the machine.

The features of the present invention which are believed to be novel are set forth with particularity in the appended claims.

Other objects and many of the attendant advantages will be more readily appreciated as the same becomes better understood by reference to the following detailed description and considered in connection with the accompanying drawings in which like reference symbols designate like parts throughout the figures.

DESCRIPTION OF THE DRAWINGS

FIG. 3 is a schematic side view as shown in FIG. 1 but in a modified embodiment having a guide device provided with a carrier for the article (workpiece) and FIG. 4 is a perspective view of a machine tool provided with the guide device of FIG. 3.

DESCRIPTION OF PREFERRED EMBODIMENTS

In the device for transferring articles from a feed path or tooling path A to a lower path B, to wit a guide device 1 is applied in a machine tool, more particularly a woodworking machine, viz. a tenoner, as will be further elucidated hereunder. The guide device 1 of the FIGS. 1 and 2 has been shaped as a chute and is situated at some distance behind and below the feed path A.

Articles are ejected from the feed path A in a manner to be described more fully hereafter and arrive at the guide device 1 in the shape of a chute. This situation is indicated by means of an article 2B, located between the feed path A and the guide device 1. The location 3 on the chute where it is contacted by the articles coming from the feed path A forms a vertical component of the guide device and is at a distance h below the end of the feed path. Below this location 3 the guide device follows a curved course to the beginning of the discharge path and forms there a horizontal component of the guide device. The effect of the chute is such that the article to be transferred first undergoes a falling motion (article 2b). The velocity of the fall or advance is then decelerated, as illustrated by the position of article 2c, and consequently the device according to the invention is embodied such, that a vertical component of the guide device 1 has been situated at the end of the tooling path A and a horizontal component of said guide device passes into the discharge path while the vertical component changes the direction of the arriving article.

The special feature herein is that the chute is at least partially deformable under the influence of the weight and kinetic energy of the article, as will be explained with reference to FIG. 2. The guide device 1 may incorporate one or more strips of flexible material which comprise a vertical and horizontal component and are fitted following the curved course of the chute and fastened at the upper end in the vicinity of the end of the feed path and at the lower end at the beginning of the discharge path.

Figure 2:
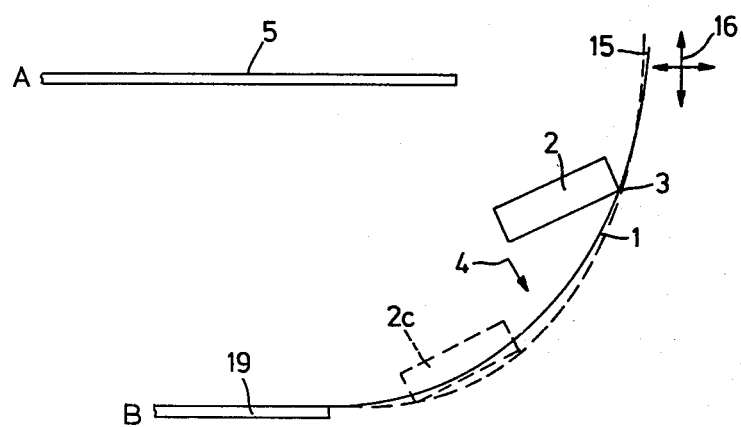
FIG. 2 is also a schematic view of a section shown in FIG. 1; the behavior of a guide device in a first embodiment being illustrated under the influence of an article.

When an article comes from the feed path A and collides with the chute 1, the chute will deflect somewhat, as is illustrated in FIG. 2 by a solid line for article 2. As a result of said deflection, the kinetic energy generated when the article is ejected rapidly from the feed path A, or the velocity of fall of the article is absorbed resiliently and decelerated. The article will thereby tilt backwards, as indicated by the arrow 4 in FIG. 2, when the height of fall over the distance h is great and the velocity of advance along the feed path A is low.

If the device is mounted on a machine tool, more particularly a woodworking machine such as a tenoner, the feed path A is the working bed of the machine 5 with a workpiece holder 6. The articles 2, thus in the present case the workpieces in the form of a horizontal rectangular prism, are placed in a stack in a shaft 7. Beneath this shaft is a carriage 8 with a retracted clamp 12, which can be moved in the direction of the arrow 9, as a result of which the lower end of the shaft 7 becomes clear and the lowest workpiece from the stack in the said shaft can drop onto the working bed 5.

When the carriage 8 is moved in a direction contrary to that of the arrow 9, thus in the direction of operation of the path A, the workpiece holder 6 pushes the workpiece or article 2a to an operating station where a milling cutter 11, circulating along a path indicated by a dot and dash line 10, mills a tenon at the end of the workpiece 2a. A double set of cutters, placed at the correct distance from each other, may be used for this purpose, so that the workpiece may move between the said cutters and a tenon may be milled at either end of the workpiece. At this position the workpiece is pushed into the holder 6 with the aid of the controllable clamp 12.

The clamp 12 can be swung out of the path of the article or workpiece, for instance by a cylinder-piston system 13, when the workpiece holder 6 pushes the article further in the direction of the chute 1 after completion of the tooling operation. The workpiece may be pushed directly from the working bed of the machine 5 in a single movement or it may be advanced only partially, in which case a preceding workpiece still lying on the working bed of the machine 5 is pushed aside by the following workpiece until it falls from said bed.

In this latter case it is recommended to use a removable abutment 14 in order to prevent a workpiece situated in front of it from falling accidentally from the working bed of the machine 5. Depending on the phase of operation of the machine, the abutment may, for instance, be controlled simultaneously with the actuation of the cylinder-piston system for the clearance of the clamp 12. This also presents the possibility of a greater variation in the dimensions of the workpiece, without necessitating special measures to ensure that the workpiece arrives from the working bed of the machine 5 onto the guide device 1 at the proper moment. In connection with the dimensions of the workpiece, it is therefore recommended that the vertical component at the upper edge 15 of the chute 1 be made adjustable, for instance in the direction of the arrows designated by the reference numeral 16 in FIG. 2.

If workpieces with a rectangular cross-section and a large length to width ratio are used and the said workpieces must be discharged on their small side, the invention provides for a tilting mechanism to be mounted at the end of the chute and the beginning of the discharge path B. Articles placed on their small side on the discharge path B would be liable to overturn during further conveyance and in order to prevent this, one or more supporting elements 18, passing along the discharge path, operate in conjunction with the tilting mechanism. The supporting elements are preferably brushes, placed parallel to the discharge path, the hairs of which can come into contact with the articles on the discharge path.

The machine tool according to the invention, more particularly a woodworking machine, such as a tenoner, is fitted with a device for transferring articles, the feed path A being the working bed of the machine 5 with a workpiece holder 6. Said holder with which the workpieces can be displaced at least before and after the tooling operation, is moreover so constructed that the discharge path B is set up in the form of a supporting rails 19, below the working bed 5 of the machine. The guide device 1 is mounted as a guard plate at a distance from the working bed.

Moreover, the conveyor surface 19 of the machine tool is a rail passing to the laying-on side of the machine. The tilting mechanism 17 placed at the horizontal component of the guide device is a hinged folding element, which in one final position is flush with the surface of the rails 19 and the end of the chute 1, in another position the element is perpendicular to the surface of the rails. Articles 2 which automatically arrive at the end of the chute 1 with the long side of their cross section, thus also arrive with their long side on the folding element, whereby the said articles turn onto their small side after the tilting of the folding element.

In the embodiment of FIG. 3 the guide device is not shaped as a chute but as an L-shaped guiding track, the leg 20 of which forms the vertical component while the leg 21 forms the horizontal component.

Figure 1:
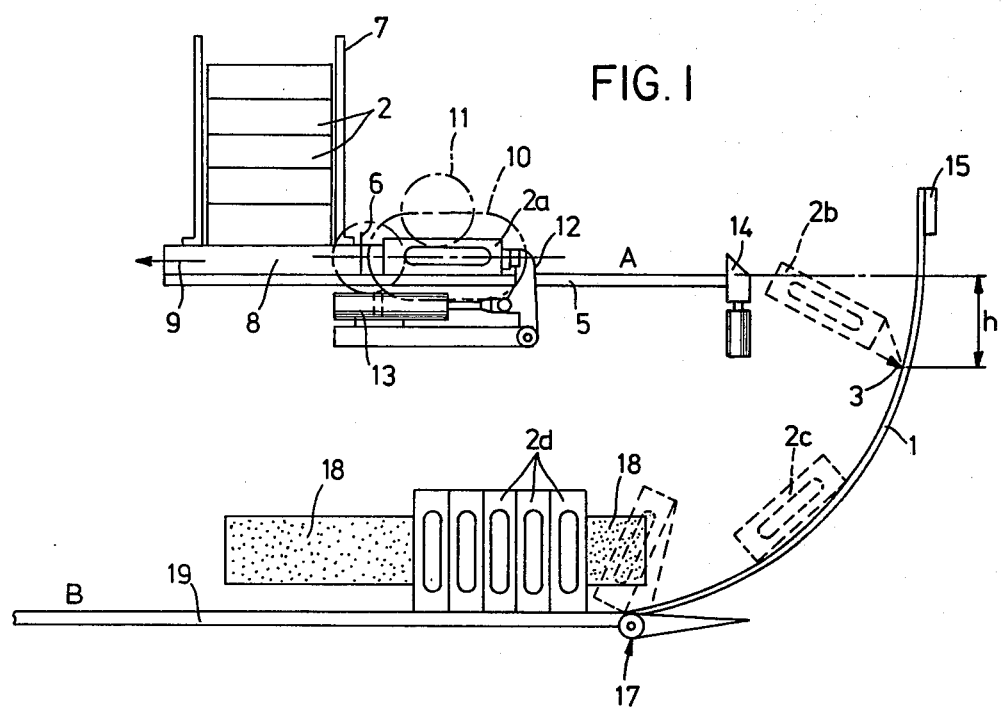
FIG. 1 is a schematic side view of certain main components of a machine tool with a guide device for transferring articles.

The other parts of the schematic side view of the machine tool have been denoted by the same reference numerals as in FIG. 1 in so far as it concerns the same operational properties.

The guide device 1 possesses a carrier 22 movable along the vertical and horizontal component for carrying the workpiece. The supporting surface 23 of the movable carrier 22, when moving in the horizontal component, lies below the discharge path, as denoted in the figure, with a dotted line.

The vertical and horizontal legs 20, 21 constituting the vertical and horizontal components of the guide device 1, respectively, form a guiding track for the movable carrier 22. The guide device 1 has been provided with driving means comprising a chain 28 running over chain wheels 24, 25, 26 and 27.

The chain 28 is driveably connected to a carriage 8 movable in the tooling path, for articles to be tooled. Furthermore, the carrier 22 is connected to a link of the chain 28 by a pivotable arm 30.

The guide device 1 in the shape of a unit (FIG. 3) can be adjustably fitted on a machine tool by means of claws 31 straddling the bed 32 of the machine tool (FIG. 4).

The tooled articles 2d are positioned flatly on the discharge path B (FIG. 3). If the articles are to be placed in an upright position a tilting mechanism 17 (FIG. 1) can be used for tilting the articles resting on the guide device 1 in a vertical position on the discharge path B.

It will be evident that the invention also relates to a machine tool, more particularly a wood working machine such as a tenoner, provided with a guide device 1 as described above. In such a machine tool the tooling path A is formed by the working bed 5 with the workpiece clamp 12 and the workpiece holder 6 on carriage 8 for displacing the workpieces at least before and after the tooling operation. The discharge path is formed by supporting rails 19 positioned below the working bed 5 and the guide device 1 has been positioned behind and below the working bed. As illustrated in FIGS. 1, 3 and 4, the supporting rails run toward the tending side of the machine whereas the tilting mechanism 17 (FIG. 1) is formed by a pivotable flap member cooperating with the supporting rails 19 and the end of the horizontal component of the guide device in one end position and perpendicular to a plane formed by the supporting rails 19 in another end position.

As the chain 28 has been coupled to means for conveying the workpiece including the work piece holder 6, the work piece carriage 8 and clamp 12 via the chain 29, the movement of the carrier 22 is in phase with the displacement of the workpieces on the working bed 5.

The workpiece carriage 8 and the carrier 22 can perform a reciprocating movement because the chain wheel 27 or the chain wheel for the workpiece carriage 8, are coupled to a chain wheel slideably positioned on a driving spindle 34 via a chain 33. The spindle 34 can rotate in two directions successively by means of a reversable step motor 35.

The advantage of the invention is in that the tooled workpieces in an oriented position can be handled at the tending side of the machine tool so that the workpieces will not arbitrarily drop behind the machine tool.

What is claimed is:

1. A guide device for transferring an article from a feed path to a discharge path lower than the feed path, the feed path having a first end and a second end opposite the first end, the article moving along the feed path from the tending side to the second end, the guide device comprising a vertical component situated at the second end of the feed path for changing the direction of the article when it arrives from the feed path for bringing the article in a pre-oriented position to the discharge path, the article moving on the discharge path generally toward the first end of the feed path, the guide device further comprising a carrier for the article, the carrier being movable along the vertical and horizontal components of said guide device.

2. The guide device of claim 1 in which the carrier of the guide device has a supporting surface arrayed below a supporting plane of the discharge path when the carrier is moving along the horizontal component to said discharge path.

3. The guide device of claim 1 wherein the vertical and horizontal components of the guide device form a guiding track for the movable carrier, the guide device further comprising driving means for moving said carrier along said guiding track.

4. The guide of claim 3 wherein the driving means comprises chainwheels and a chain running on the chainwheels and driveably connected to a conveying mechanism for articles to be tooled, the conveying mechanism moving in the feed path.

5. The guide device of claim 4, in which the driving means further comprises a pivotable arm for coupling the carrier to a link of the chain.

6. The guide device of claim 1 wherein the carrier moves in phase with the movement of the articles along the feed path.

7. A device for transferring an article from a feed path to a discharge path lower than the feed path, the feed path having a first end and a second end oposite the first end, the article moving along the feed path from the first end to the second end, the device comprising:
a guide track having a vertical component situated adjacent the second end of the feed path and a horizontal component situated adjacent the discharge path; and
a carrier movably mounted on the guide track for carrying the article from the second end of the feed path along the vertical component and for delivering the article to the discharge path along the horizontal component for discharging the article generally toward the first end of the feed path.

8. The device of claim 7 wherein the carrier comprises a support surface for supporting the article, the support surface being below a support plane of the discharge path when the carrier is delivering the article to the discharge path along the horizontal component.

9. The device of claim 7 further comprising driving means along the guiding track for reciprocally moving the carrier along the horizontal and vertical components of the guiding track.

10. A tenoning machine for an article, the tenoning machine having a tending side and being operated from the tending side, the tenoning machine comprising:
a working path having a first end at the tending side and a second end opposite the tending side;
conveying means for displacing the article from the first end to the second end of the working path;
a discharge path lower than the feed path, the discharge path comprising a support rail below the working path, the article moving on the support rail toward the tending side;
a guide track comprising a vertical component situated at the second end of the working path for changing the direction of movement of the article when the article leaves the second end of the working path, the guide track further comprising a horizontal component below the level of the support rail for bringing the article to the discharge path in a pre-oriented position;
a movable carrier mounted on the guide track for carrying the article along the vertical and horizontal components after tenoning;
driving means connected to the conveying means for driving the carrier.

* * * * *